Patented Mar. 15, 1932

1,849,508

UNITED STATES PATENT OFFICE

HANS SVANOE, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

FERTILIZER MANUFACTURE

No Drawing. Application filed September 25, 1929. Serial No. 395,200.

This invention relates to fertilizers, particularly to phosphate fertilizers containing nitrogen and methods for the manufacture thereof.

Ordinary commercial superphosphate is produced by effecting the decomposition of phosphate rock with sulfuric acid and drying the resultant product to condition it for mechanical distribution. It has heretofore been proposed to substitute nitric acid for sulfuric acid in the above reaction. By thus decomposing phosphate rock with nitric acid rather than sulfuric acid, nitrogen is incorporated into the superphosphate and at the same time the presence of inert calcium sulfate is avoided. Both of these factors are advantageous in that a more concentrated fertilizer is produced. Generally speaking, however, nitrated superphosphate, the reaction product of phosphate rock and nitric acid, leaves much to be desired because of the presence of calcium nitrate therein, which, being hygroscopic, makes the drying of nitrated superphosphate as well as its preservation in a dry state quite difficult.

With a view to avoiding these and other disadvantages characteristic of previously known fertilizers of the type referred to, it is the object of the present invention to produce a concentrated fertilizer high in available phosphorus and nitrogen.

It is a further object of the invention to provide a new and improved process for producing a fertilizer of the character described.

Other objects and advantages of the invention will be apparent as it is better understood by reference to the following specification in which its details and preferred embodiments are described.

In accordance with the present invention I produce a concentrated fertilizer by reacting phosphate rock, for example Florida phosphate, coprolite, apatite, etc., with nitric acid and ammonium carbamate. This is accomplished by decomposing the phosphate rock with nitric acid and treating the resultant product with ammonium carbamate to produce a fertilizer which is not only high in nitrogen and available phosphorus but also relatively stable, non-hygroscopic and non-corrosive and otherwise well adapted to the requirements of storage, shipment, and distribution.

Various proportions of nitric acid may be used in effecting the decomposition of phosphate rock, depending largely upon the desired chemical content of the final product. Thus I may use nitric acid of such amount and concentration as to convert substantially all of the tricalcium phosphate in the rock to monocalcium (water soluble) phosphate with which there will be associated calcium nitrate and some free acid. For instance, this may be accomplished with a rock containing 68% tricalcium phosphate by using about 1660 parts of 50% nitric acid per 1000 parts of rock. However, I have found that it is not necessary for the purpose of the present invention to decompose the rock completely to monocalcium (water soluble) phosphate, as a final product containing satisfactorily low proportions of citrate insoluble $P_2O_5$ may be obtained by using in the decomposition stage proportions of nitric acid as low as 80% of those above stated. Generally speaking, it is desirable for the satisfactory accomplishment of the objects of the invention that such amounts of nitric acid be used as will correspond to from about 3-5 moles of $HNO_3$ per mole of $P_2O_5$ in the phosphate rock, plus the amount of acid chemically equivalent to the non-phosphatic constituents (calcium carbonate, calcium fluoride, etc.) of the rock. With less than the quantity of $HNO_3$ indicated I have found that not all of the tricalcium phosphate is reacted upon; with more, nitric acid is wasted, principally by volatilization due to heat of reaction.

While the invention is not limited to the use of any particular temperature in the addition of ammonium carbamate, I have observed that a temperature below 40° C., the calcium nitrate in the phosphate rock-nitric acid decomposition product tends to crystallize with the result that the mass becomes hard and difficultly workable. In my process, therefore, I prefer to mix ammonium carbamate with the still warm decomposition product of phosphate rock and nitric acid, thus utilizing the heat of the decomposition to preserve the mass in a more or less fluid condition favorable to the more satisfactory incorporation of ammonium carbamate therewith. Whether the decomposition product is pasty, mushy or practically liquid will depend not only upon its temperature but also upon the concentration and quantity of nitric acid used in opening up the rock.

The proportions of ammonium carbamate used to react with the decomposed rock may be varied within relatively wide limits depending upon the desired physical form and chemical content of the final product. For example, sufficient ammonium carbamate may be mixed with the nitrated superphosphate to neutralize the free acid and to react with a part or all of the calcium nitrate present; or the reaction may be made to go still further by adding enough ammonium carbamate to convert substantially all of the phosphoric acid, present as mono-, di- or tricalcium phosphates, to mono- or diammonium phosphates.

By decomposing phosphate rock with nitric acid and treating the resultant product with sufficient ammonium carbamate to neutralize the free acid and to react with substantially one-half of the calcium nitrate present, a stable phosphate fertilizer, containing both ammonium nitrate and calcium nitrate, may be obtained. The non-hygroscopic and stable character of this product is the more surprising on account of the known avidity of calcium nitrate and ammonium nitrate for water.

Moreover, if desired, a product containing even higher proportions of nitrogen may be obtained by decomposing phosphate rock with nitric acid and mixing with the resultant product sufficient ammonium carbamate to neutralize the free acid and to react with all of the calcium nitrate present. For example, by decomposing 68% Florida phosphate rock with 50% nitric acid and thereafter mixing the product with sufficient ammonium carbamate to neutralize free acids and to react with all of the calcium nitrate present, a very desirable fertilizer containing calcium carbonate, dicalcium phosphate and ammonium nitrate in approximate molar ratios of 1:1.3:3.6 may be produced. Calcium carbonate, although to some extent an inert material in fertilizers, is of demonstrated high value in eliminating soil acidity. Ammonium nitrate is particularly desirable because of its high nitrogen content.

By effecting the decomposition of phosphate rock with nitric acid and treating the decomposition product with even higher proportions of ammonium carbamate, a fertilizer may be produced, containing, besides ammonium nitrate and calcium carbonate, mono- or diammonium phosphates or mixtures thereof with only a relatively small proportion of citrate insoluble $P_2O_5$. This type of fertilizer is particularly advantageous because of its high content of available nitrogen.

While it is to be understood that the invention herein described is susceptible of considerable variation and modification in the manner of its application, particularly as regards proportions of materials used and specific conditions of operation, the following examples will serve to show how the invention may be practiced.

*Example 1.*—Finely ground Florida pebble rock containing 68% tricalcium phosphate was decomposed with 50% nitric acid using 1660 parts by weight of acid to 1000 parts by weight of rock. With 200 parts by weight of the resultant product while warm (above 40° C.) there was mixed 15.7 parts by weight of substantially pure ammonium carbamate, which is approximately one-half that required to convert the calcium nitrate in the decomposed rock. After cooling, the product analyzed 13.2% total phosphoric acid (calculated as $P_2O_5$) of which 34.2% was water soluble, 64% citrate soluble, and 1.8% citrate insoluble phosphate. The per cent. by weight of citrate insoluble $P_2O_5$ based on the total weight of the product was 0.24%.

*Example 2.*—Two hundred parts by weight of a warm decomposition product similar to that used in Example 1 was treated with 38.7 parts of ammonium carbamate, which is somewhat in excess of that required to react with all the calcium nitrate in the decomposed rock. The resultant fertilizer analyzed 11.65% total $P_2O_5$ of which 97.4% was citrate soluble and 2.6% citrate insoluble phosphate. In this case, all of the monocalcium phosphate was apparently converted to dicalcium phosphate. The product contained 5.8% ammonia nitrogen and 6.4% nitrate nitrogen or a total of 12.2% nitrogen. The per cent. of citrate insoluble $P_2O_5$ based upon the total weight of the resultant product was 0.30%. It will be noted that, although twice as much ammonium carbamate was used in this case as in the previous example, there was no substantial increase in reversion to citrate insoluble phosphate.

Proportions of ammonium carbamate in considerable excess of those in the above examples may be used in order to increase the nitrogen content of the final product without causing appreciable reversion to citrate insoluble $P_2O_5$. For example, by reacting 200 parts of a phosphate rock-nitric acid decomposition product, similar to that used in the foregoing examples, with 75 parts of ammonium carbamate, the total nitrogen was increased to about 14.5% with a total citrate insoluble $P_2O_5$ in the resultant product of only 0.17%.

The products prepared in accordance with the foregoing examples may, if desired, be used directly in the preparation of so-called mixed goods, i. e. by incorporation with other fertilizer materials, or they may advantageously be used alone, in which case before packing and shipment they are preferably submitted to drying in the known manner.

Generally speaking, the ammonium carbamate used in the process should be of the highest grade procurable and economically feasible to use. Avoidance of the presence of the ammonium carbonates is recommended, although not essential, as I have found that these salts are in no sense the equivalent of the carbamate, particularly as regards the degree of reversion to citrate insoluble phosphate produced.

It will be understood that, if desired, other substances may be incorporated in the fertilizer as, for example, other fertilizing or inert materials, these being introduced, as may be most convenient, either before, during, or after treatment of nitrated superphosphate with ammonium carbamate.

Various changes may be made in the method described without departing from the invention or sacrificing any of the advantages thereof.

I claim:

1. The process of manufacturing a concentrated fertilizer containing available phosphorus and nitrogen which comprises reacting phosphate rock with nitric acid and treating the resultant product with sufficient ammonium carbamate to render the fertilizer substantially non-hygroscopic.

2. The process of manufacturing a concentrated fertilizer containing available phosphorus and nitrogen which comprises reacting phosphate rock with nitric acid and treating the resultant product in a warm condition with sufficient ammonium carbamate to render the fertilizer substantially non-hygroscopic.

3. The process of manufacturing a concentrated fertilizer containing available phosphorus and nitrogen which comprises reacting phosphate rock with nitric acid and treating the resultant product at a temperature in excess of about 40° C. with sufficient ammonium carbamate to render the fertilizer substantially non-hygroscopic.

4. The process of manufacturing a concentrated fertilizer containing available phosphorus and nitrogen which comprises decomposing phosphate rock with suitable proportions of nitric acid to convert substantially all of the tricalcium phosphate contained therein to water soluble calcium phosphate and reacting the resultant product with sufficient ammonium carbamate to render the fertilizer substantially non-hygroscopic.

5. The process of manufacturing a concentrated fertilizer containing available phosphorus and nitrogen which comprises decomposing phosphate rock with suitable proportions of nitric acid to convert substantially all of the tricalcium phosphate contained therein to water soluble calcium phosphate and reacting the resultant product in a warm condition with sufficient ammonium carbamate to render the fertilizer substantially non-hygroscopic.

6. The process of manufacturing a concentrated fertilizer containing available phosphorus and nitrogen which comprises decomposing phosphate rock with suitable proportions of nitric acid to convert substantially all of the tricalcium phosphate contained therein to water soluble calcium phosphate and reacting the resultant product at a temperature in excess of about 40° C. with sufficient ammonium carbamate to render the fertilizer substantially non-hygroscopic.

7. The process of manufacturing a concentrated fertilizer containing available phosphorus and nitrogen which comprises reacting phosphate rock with nitric acid to yield a product containing free acid and calcium nitrate, and treating the same with proportions of ammonium carbamate sufficient to neutralize the free acid and to react with at least a part of the calcium nitrate.

8. The process of manufacturing a concentrated fertilizer containing available phosphorus and nitrogen which comprises reacting phosphate rock with nitric acid to yield a product containing free acid and calcium nitrate, and treating the same in a warm condition with proportions of ammonium carbamate sufficient to neutralize the free acid and to react with at least a part of the calcium nitrate.

9. The process of manufacturing a concentrated fertilizer containing available phosphorus and nitrogen which comprises reacting phosphate rock with nitric acid to yield a product containing free acid and calcium nitrate, and treating the same at a temperature in excess of about 40° C. with proportions of ammonium carbamate sufficient to neutralize the free acid and to react with at least a part of the calcium nitrate.

10. The process of manufacturing a concentrated fertilizer containing available phosphorus and nitrogen which comprises reacting phosphate rock with nitric acid to yield a product containing free acid and calcium nitrate, and treating the same with proportions of ammonium carbamate sufficient to neutralize the free acid and to react with substantially all of the calcium nitrate.

In testimony whereof, I affix my signature.

HANS SVANOE.